(12) United States Patent
Moon et al.

(10) Patent No.: US 10,871,312 B2
(45) Date of Patent: Dec. 22, 2020

(54) TRANSPORT REFRIGERATION UNIT WITH VENTED CRYOGENIC COOLING

(71) Applicants: William G. Moon, Provo, UT (US); William J. Hancock, Bellevue, WA (US); Steven J. Parkinson, Clinton, UT (US); Steven V. Boyce, Spanish Fork, UT (US)

(72) Inventors: William G. Moon, Provo, UT (US); William J. Hancock, Bellevue, WA (US); Steven J. Parkinson, Clinton, UT (US); Steven V. Boyce, Spanish Fork, UT (US)

(73) Assignee: Reflect Scientific Inc., Provo, UT (US)

( * ) Notice: Subject to any disclaimer, the term of this patent is extended or adjusted under 35 U.S.C. 154(b) by 0 days.

(21) Appl. No.: 16/826,885

(22) Filed: Mar. 23, 2020

(65) Prior Publication Data

US 2020/0284479 A1 Sep. 10, 2020

Related U.S. Application Data

(63) Continuation of application No. 16/034,145, filed on Jul. 12, 2018, now Pat. No. 10,634,395, which is a (Continued)

(51) Int. Cl.
*F25D 3/10* (2006.01)
*F25B 19/00* (2006.01)
(Continued)

(52) U.S. Cl.
CPC ............ *F25B 19/005* (2013.01); *F16K 49/00* (2013.01); *F25B 2400/01* (2013.01); *F25D 2400/30* (2013.01); *G05B 23/0283* (2013.01)

(58) Field of Classification Search
CPC . F25D 3/10; F25D 3/105; F25D 3/107; F25D 3/102; F35B 19/005; B60H 1/00964; F25B 19/005
See application file for complete search history.

(56) References Cited

U.S. PATENT DOCUMENTS 3,757,531 A * 9/1973 Gement, Jr. ............... F25D 3/10
62/156
4,182,134 A * 1/1980 Viegas ................... F25D 19/003
62/298

(Continued)

FOREIGN PATENT DOCUMENTS

GB 2542604 A * 3/2017 ............. F25D 3/105
WO WO-2012126711 A1 * 9/2012 ............. F25D 11/003

*Primary Examiner* — Frantz F Jules
*Assistant Examiner* — Erik Mendoza-Wilkenfel
(74) *Attorney, Agent, or Firm* — Patent Law Office, PC; Bao Tran

(57) ABSTRACT

A Transport Refrigeration Unit (TRU) includes one or more evaporators inside the TRU each containing two manifold tubes located at opposite ends of the evaporator and a multiplicity of cooling tubes traversing between the manifold tubes; one or more super-insulated vacuum tanks located in front of, beneath or inside the TRU, filled with liquid nitrogen, carbon dioxide or a cryogenic coolant connected to the one or more evaporators using vacuum-insulated pipes; a solenoid or pneumatic valve located upstream or downstream of the evaporator to meter a flow of nitrogen through the evaporator; a temperature controlling circuit that operates the solenoid or pneumatic valve; a flow restricting device that limits the flow of the cryogenic coolant through the evaporator; a vent pipe to vent the spent coolant outside the TRU; and a multiplicity of fans located adjacent to and above the evaporators that distribute the cooled air uniformly throughout the TRU.

18 Claims, 4 Drawing Sheets

Related U.S. Application Data continuation of application No. 15/708,143, filed on Sep. 19, 2017, now Pat. No. 10,047,978.

(51) Int. Cl.
*F16K 49/00* (2006.01)
*G05B 23/02* (2006.01)

(56) References Cited

U.S. PATENT DOCUMENTS

| | | | |
|---|---|---|---|
| 6,408,632 B1* | 6/2002 | Cashin | C21D 6/04 62/51.1 |
| 2004/0216469 A1* | 11/2004 | Viegas | F25D 29/003 62/50.2 |
| 2009/0071088 A1* | 3/2009 | Viegas | B62D 33/048 52/406.1 |
| 2009/0266100 A1* | 10/2009 | Viegas | F25D 3/105 62/335 |
| 2013/0340444 A1* | 12/2013 | Bryant | B60H 1/00964 62/62 |
| 2015/0316311 A1* | 11/2015 | Kopecka | F28D 20/021 62/95 |
| 2015/0330679 A1* | 11/2015 | Bowdish | H02K 7/1815 62/239 |
| 2017/0234597 A1* | 8/2017 | Moon | F25D 3/102 62/50.2 |

* cited by examiner

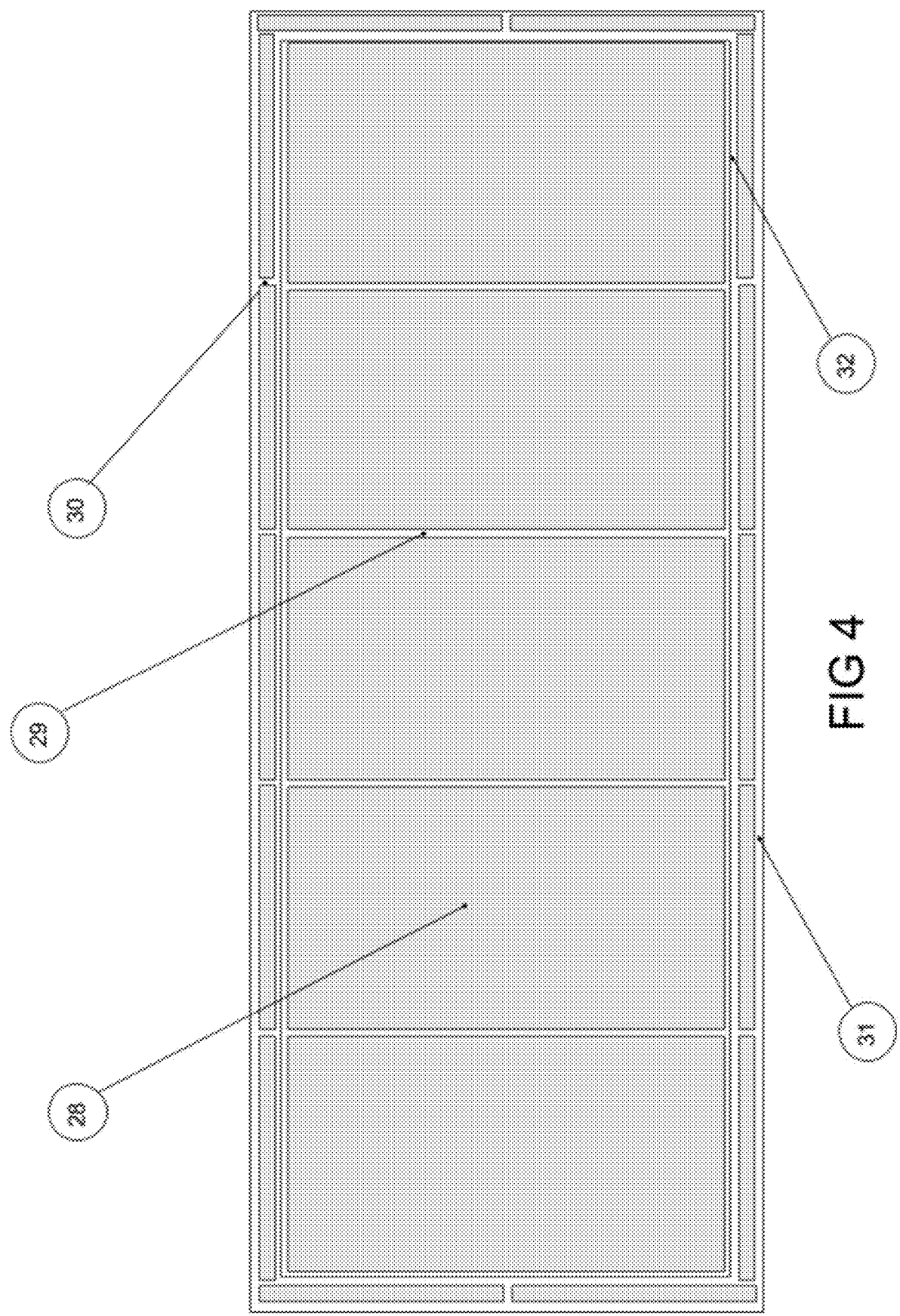

TRANSPORT REFRIGERATION UNIT WITH VENTED CRYOGENIC COOLING

FIELD OF INVENTION

The present invention is related to a Transport Refrigeration Unit with Vented Cryogenic Cooling.

BACKGROUND OF INVENTION

Perishable goods are transported on the road in a temperature controlled box that is referred to as a Transport Refrigeration Unit or TRU. TRUs are typically found on semi-trailer tractors and may also be on vans, trucks, railcars and ships. A conventional TRU is powered by an engine that runs on diesel or gasoline fuel to provide the cooling. The engine rotates a shaft that typically powers a compressor that compresses the coolant from a gas to a liquid, and moves the coolant through a condenser and then an evaporator to provide cooling. The engine also powers fans for moving the air in the TRU. Drawbacks to the current configuration are tailpipe emissions, acoustic noise, and many moving parts that cause increased maintenance and downtime. Current state of the art cryogenic TRUs direct inject the coolant into the TRU. This causes oxygen depletion in the TRU and safety concerns. There is a need in the art for a TRU design that overcomes these concerns.

SUMMARY

A Transport Refrigeration Unit (TRU) includes one or more evaporators inside the TRU each containing two manifold tubes located at opposite ends of the evaporator and a multiplicity of cooling tubes traversing between the manifold tubes; one or more super-insulated vacuum tanks located in front of, beneath or inside the TRU, filled with liquid nitrogen, carbon dioxide or a cryogenic coolant connected to the one or more evaporators using vacuum-insulated pipes; a solenoid or pneumatic valve located upstream or downstream of the evaporator to meter a flow of nitrogen through the evaporator; a temperature controlling circuit that operates the solenoid or pneumatic valve; a flow restricting device that limits the flow of the cryogenic coolant through the evaporator; a vent pipe to vent the spent coolant outside the TRU; and a multiplicity of fans located adjacent to and above the evaporators that distribute the cooled air uniformly throughout the TRU.

Certain embodiments of the present system satisfy the list of needs described above and also provide other advantages. The present system does not have an engine or compressor. It has no moving parts except for fan blades. The cooling system operates on the principle of an extremely cold liquid or gas flowing through coils in an evaporator and distributing the cold air throughout an insulated vessel. The coolant vents to the atmosphere.

In the preferred embodiment, cryogenic tanks are attached to the front or underneath the TRU and filled with liquid nitrogen. Vacuum insulated pipes connect the cryogenic tanks to one or more evaporators.

A temperature sensor inside the TRU monitors the temperature. When the temperature rises above the predetermined set point, the controller energizes a solenoid valve. The open solenoid valve causes coolant to flow into one or more evaporators inside the TRU. The evaporators are heat exchangers with copper coils and aluminum fins for maximum heat transfer. Several fans located near the ceiling move air through the evaporators and into the TRU. The air movement provides a relatively even temperature throughout the vessel.

A flow restricting device limits the flow of cryogenic coolant through the evaporators for efficiency reasons. The vent gas of the cooling system in the preferred embodiment is composed of 100% Nitrogen. The gas is vented outside the TRU and into the atmosphere, making it a truly "green source" of energy.

The circulation fans and the control system in the preferred embodiment are powered by solar panels and 2 deep cycle batteries. Alternative methods for fan and control system power are: gas turbine generator, Stirling engine, and fuel cell.

When the TRU operates during the winter, in colder climates, a method of heating is provided to protect the produce from freezing. Heating elements, located in the air flow path are powered by electricity, propane, liquefied natural gas (LNG), compressed natural gas (CNG), liquefied petroleum gas (LPG), or hydrogen.

An optional feature of the present system is diverting some of the nitrogen gas from the vent pipe to injectors inside the TRU for the purpose of food preservation.

Another optional feature is a set of one or more insulated dividers that separate the TRU into multiple compartments at different temperatures. Each successive compartment contains a small version of the main cooling system. As a means of making the TRU more efficient, the vent from one compartment is connected to supply the cooling for the next compartment, The present system has insulated partitions that retract upward in close proximity of the TRU ceiling. The open position location provides easy access to the interior of the TRU for use with a forklift or other product transport device.

Yet another optional feature of the present system is the installation of cryogenic supply and vent lines for the purpose of supporting additional smaller cryogenic freezers and vats within the TRU.

The present system uses commercially available Vacuum Insulated Panels or VIPs to increase the insulation capability of the TRU up to 5 times better than current art insulation.

Other aspects, features, and advantages of the present invention will become apparent from the following detailed description of the illustrated embodiments, the accompanying drawings, and the appended claims.

BRIEF DESCRIPTION OF THE DRAWINGS

FIG. 4 is an exemplary top view of the Vacuum Insulated Panels.

DETAILED DESCRIPTION

A description of the preferred embodiment is provided herein. It is to be understood, however, that the present system may be embodied in various forms. Therefore, specific details disclosed herein are not to be interpreted as limiting, but rather as a basis for the claims and as a representative basis for teaching one skilled in the art how to employ the present system in virtually any appropriately detailed system.

Various embodiments of the present system are directed to a green alternate source for powering a transport refrigeration unit with vented cryogenic cooling and is combined with extremely thermally efficient barriers composed of vacuum insulated panels. Now referring to FIG. 1, the preferred embodiment is a transport refrigeration unit with a cooling system powered by nitrogen as the cryogenic liquid. Carbon dioxide may also be used as the cryogen. These tanks are typically located outside the TRU. On semi-trailer tractors, the tanks 4 are located in front, or attached to the underside of the trailer. As an option, the tanks 4 may be placed inside the TRU 9, which has the disadvantage of reducing the payload volume. However, shipping TRUs are often stacked at ports and warehouses; making internal tanks more desirable for close proximity stockpiling.

Figure 1:
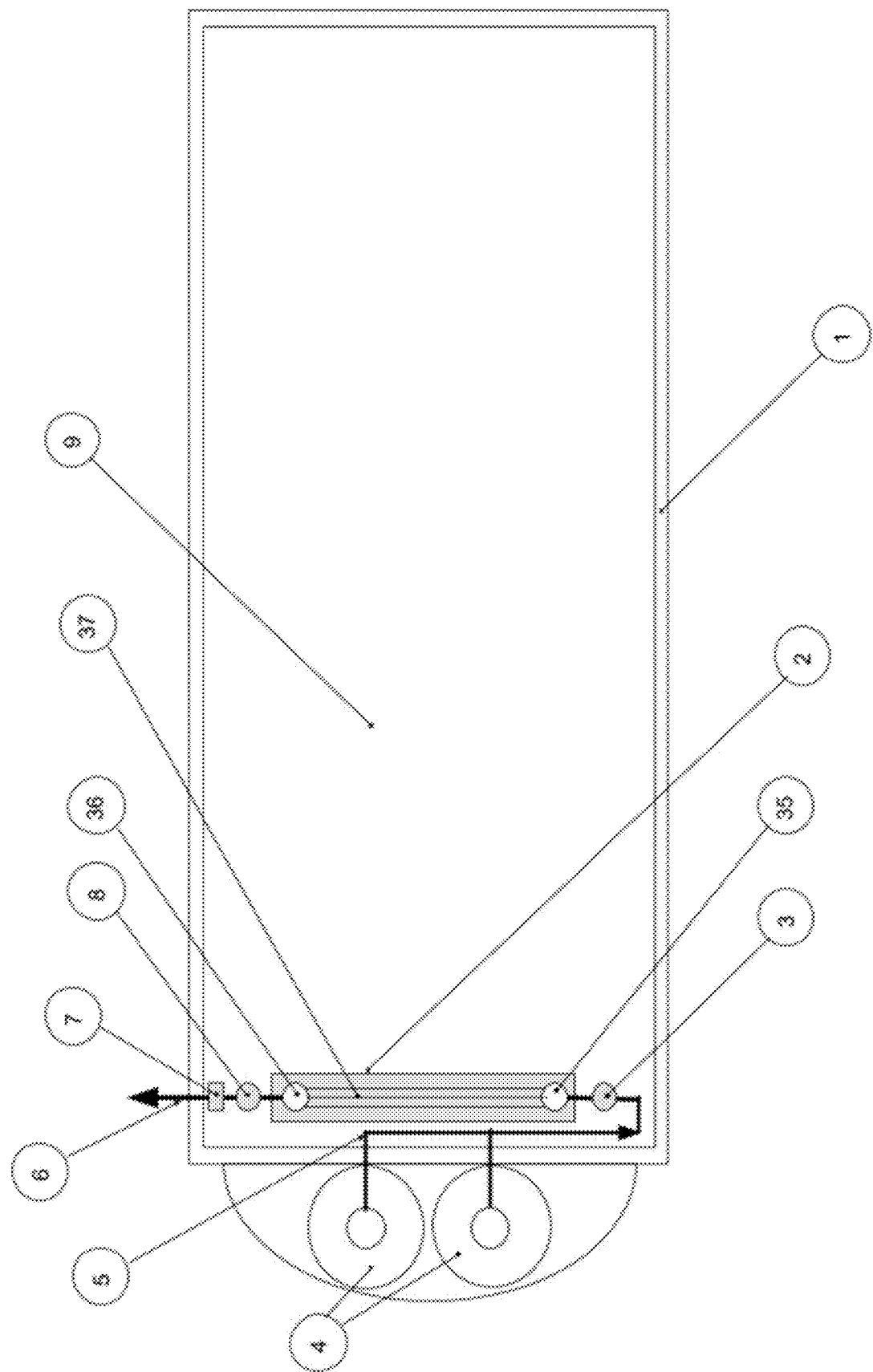
FIG. 1 is an exemplary top view of the cryogenic cooling system.
Figure 2:
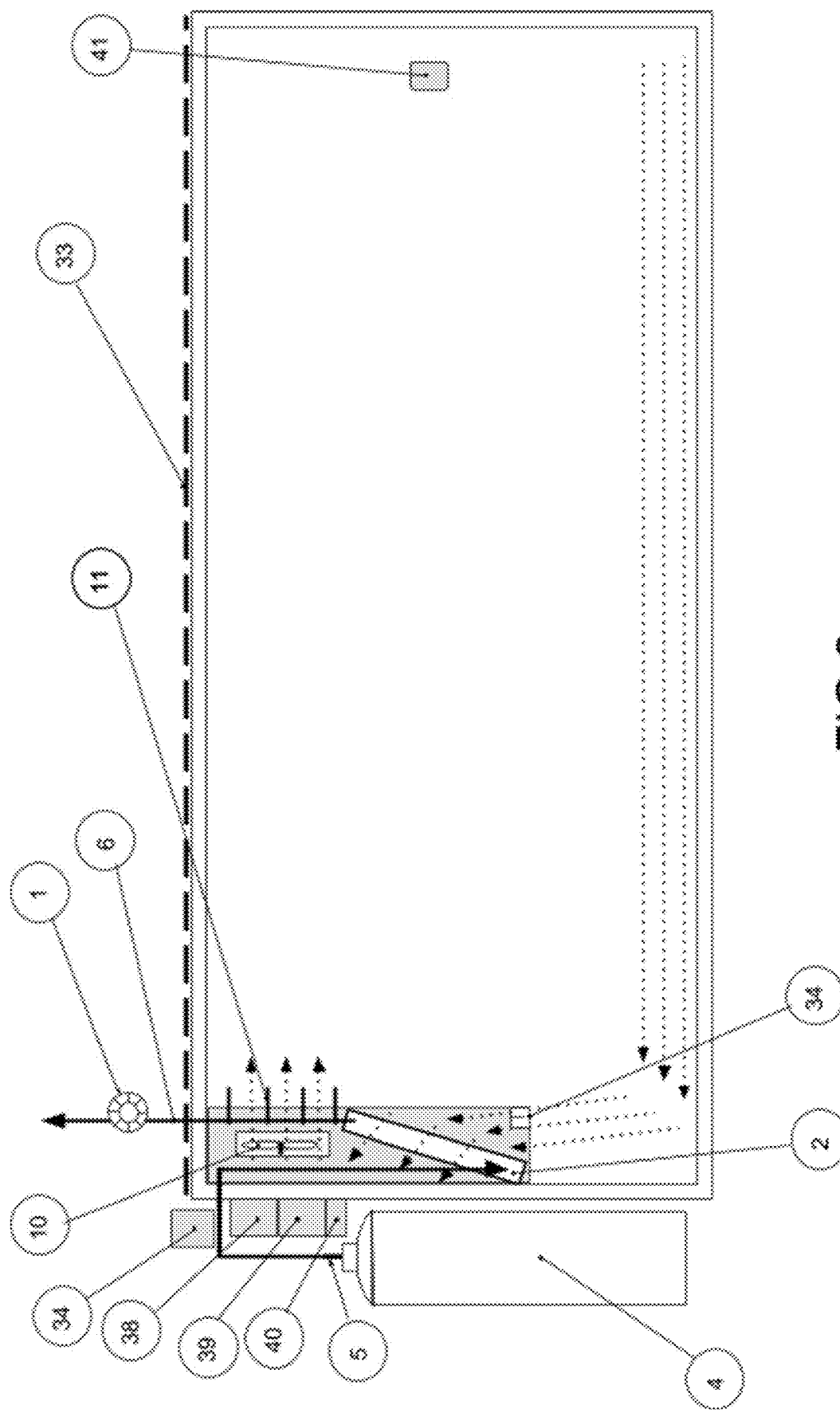
FIG. 2 is an exemplary side view of the cryogenic cooling system.
Figure 3:
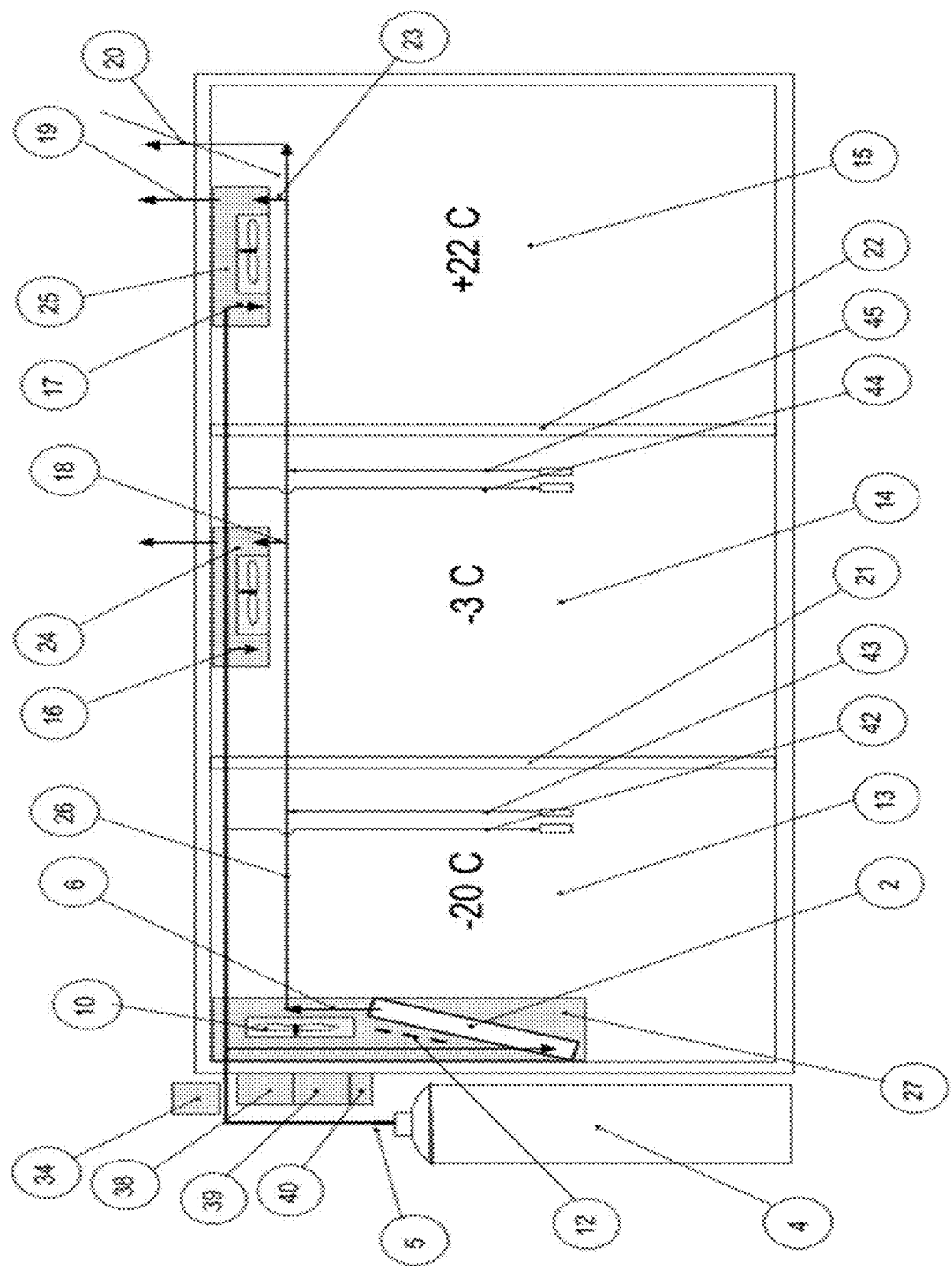
FIG. 3 is an exemplary side view of the optional multi-temperature compartments and supply and vent lines for additional freezers or vats.

Turning now to the figures, FIG. 1 is an exemplary top view of the cryogenic cooling system, FIG. 2 is an exemplary side view of the cryogenic cooling system, FIG. 3 is an exemplary side view of the optional multi-temperature compartments and supply and vent lines for additional freezers or vats, and FIG. 4 is an exemplary top view of the Vacuum Insulated Panels. In these drawings, the tanks 4 have two walls with a vacuum between the walls to reduce the losses caused by the extremely cold liquids in the tank. The cryogenic tanks 4 are referred to as Dewars and are a required means of cryogenic storage. Without vacuum insulated tanks, the heat gain would be substantial.

The cryogen is pressurized to 22 psi in the preferred embodiment with liquid nitrogen at −196 deg C. As an alternate coolant, liquid carbon dioxide may be stored at 75 psi and −60 deg C. Both pressures require a tank geometry that is spherical or cylindrical. The cylinder is of preferred choice for ease of fabrication and convenience of attachment to the TRU. In the preferred embodiment, several tanks 4 are connected in parallel. A Vacuum Insulated Pipe 5 connects the cryogenic tanks 4 to one or more evaporators 2, 24, & 25 inside the TRU 9.

A solenoid valve 3 is located either between the tanks 4 and the evaporator 2, or in a location 8 between the evaporator 2 and the evaporator vent pipe 6. In the preferred embodiment, the solenoid valve 8 is located between the evaporator 2 and the vent pipe 6. This location has the advantage of being in a less harsh environment. A solenoid valve 3 located between the cryogenic tank 4 and the evaporator 2 is subjected to much colder temperatures during normal operation. When liquid nitrogen is the coolant, the solenoid valve is subjected to −196 deg C. liquid flowing through it. However, a solenoid valve 6 located between the evaporator 2 and the vent pipe 6 has the advantage of receiving a coolant that has absorbed a large amount of heat while passing through the evaporators 2, and typically will be −20 deg C., substantially warmer than the −196 deg C. location 3. The advantage of operating in the solenoid valve in a warmer environment is less maintenance and fewer repairs.

A temperature sensor 34 inside the TRU 9 monitors the temperature. When the temperature rises above the predetermined set point, the controller energizes the solenoid valve 8, which opens the coolant flow. The coolant flows through one or more evaporators 2, 24 & 25 inside the TRU 9 each containing two manifold tubes 35 & 36, located on opposite ends of the evaporator 2 and a multiplicity of cooling tubes 37 which traverse between the manifold tubes 35 & 36. In the preferred embodiment, the coolant, liquid nitrogen, traverses the tubes 37 at cryogenic temperatures, beginning at −196 deg C. As the nitrogen flows through the tubes 37, it absorbs heat from the tubes 37 that are made of copper for high heat transfer efficiency. The evaporators 2 are heat exchangers similar to car radiators and operate on the same principle of forcing air through copper coils that are surrounded with numerous sheets of thin aluminum for maximum heat transfer. In the present system, several fans 10 located near the ceiling move air through the evaporator 2 and into the TRU 9. This air movement maintains a relatively even temperature throughout the TRU 9.

A flow restricting device 7 limits the flow of the cryogenic coolant through the evaporator 2. The cryogenic fluid, being extremely cold as it enters the evaporator, needs sufficient time in the evaporator to absorb the heat and provide efficient cooling. If the flow is not reduced by the flow restrictor 7, the coolant will exit the evaporator 2 and vent out of the TRU 9 at a much colder temperature than the set point temperature, which is lost energy, making the system less efficient. Thus a flow restrictor 7 is employed in the coolant flow stream that reduces the flow until most of the energy-absorbing capability of the coolant is transferred to the evaporator 2. The coolant vent temperature will be similar to the TRU 9 temperature, making the system more efficient.

Prior art liquid nitrogen cooling systems, known as direct inject, do not vent the nitrogen outside the TRU 9, but rather have no evaporators and shoot the liquid nitrogen into the TRU 9. This causes extremely cold areas where the liquid nitrogen is injected and warm areas that are away from the directly injected nitrogen. Further, the nitrogen gas depletes the oxygen supply in the TRU, making it a safety hazard for anyone that enters the TRU. The preferred embodiment solves this problem by venting the nitrogen through a vent pipe 6 outside the TRU 9 and into the outside air. Since air consists of 79% nitrogen, the additional nitrogen gas from the TRU 9 is compatible with air and does not have any contaminants. It is a "green" fuel source.

Energy for powering the fans 10 and the cooling system 27 originates from one or more of the following energy sources:

1. Solar Panels 33.

Solar panels 33 are mounted on top of the TRU 9. Many of the TRUs are semi-trailer tractors which have height restrictions. However, the solar panels 33 are only ⅛ inch thick and are designed to withstand 185 mile per hour winds. During the daytime, the solar panels 33 power the control system 38, fans 10, and charge 2 deep cycle batteries 39. During the evening, the deep cycle batteries 39 power the system 10 & 38 for continuous use. The system 10 & 38 is independent from other power sources and never needs charging.

2. Nitrogen Vent Gas Turbine Generator 1

Nitrogen expands almost 700 times its volume during the phase change from a liquid to a gas in the evaporator 2. The expanded vent gas 6 has substantial pressure, which is used to make electricity. A Nitrogen vent gas turbine 1 rotates a shaft that is attached to the rotor coils of a generator, and produces electricity for the fan 10 and the control system 38.

3. Stirling Engine 34

One of the advantages of using a cryogenic liquid in the cooling system is the extreme temperature difference between the surrounding temperature and the cryogen. This large temperature difference is an ideal environment for a Stirling engine 34 and greatly increases the efficiency of the Stirling engine 34, The nitrogen flows from the tanks 5 at −196 deg C. into the cold reservoir at the bottom of Stirling engine 34. The hot reservoir is the ambient air, typically 200 deg C. warmer than the cold reservoir. Thus the Stirling engine has the necessary cold and hot reservoirs and powers the fans 10 and cooling system 38.

4. Fuel Cell 40

A commercially available proton exchange membrane fuel cell (PEMFC) with a 500 watt capacity can easily power the fans 10 and cooling system 38. The byproduct is water, thus maintaining the "green" status of the current system.

5. Deep Cycle Batteries 39

The 4 power producing options listed above have the capability of storing energy in deep cycle batteries 39. When conditions are extreme, and additional power is needed, the deep cycle batteries 39 will provide this peak power.

When the TRU 9 operates during the winter in colder climates, and transports produce, there is a need to heat the TRU 9 to maintain a set point of 3 deg C. The heating capability of the system is by means of a heating element 12 located in the air flow path which is used for cooling. This heating element 12 is powered by electricity, propane, liquefied natural gas (LNG), compressed natural gas (CNG), liquefied petroleum gas (LPG), or hydrogen.

Nitrogen is used as a food preservative. Another optional feature of the present system is to divert some of the nitrogen gas into injectors 11 inside the TRU 9 for the purpose of food preservation. As a safety measure, an oxygen gas monitor alarm 41 sounds an alarm, that warns personnel to not enter the TRU 9 until the oxygen concentration is at a safe level.

Many TRU 9 deliveries require product at several temperatures to be shipped in the same unit. For example, frozen goods at −20 deg C. 13 will be shipped with produce at 3 deg C. 14 and dry goods that are shipped at room temperature 15. Another optional feature is a multiplicity of insulated dividers 21 & 22 that separate the TRU into multiple compartments at different temperatures. Each successive compartment contains a smaller version 24 & 25 of the main cooling system 27.

As a means of making the TRU more efficient, the vent 6 from the main cooling system 27 flows through a pipe 26 to the inlet ports 18 & 23 in the two compartments 14 & 15. Even though the nitrogen that vents the main compartment 13 is spent and the temperature is insufficient to continue cooling the main compartment 13, each successive compartment 14 & 15 has a higher temperature set point and the spent nitrogen will have sufficient energy to cool successive compartments 14 & 15.

To ensure continuous cooling capability of each successive compartment 14 & 15 when the main cooling system 27 is off and there is no vent gas 6, a second line 5 that comes directly from the tanks is attached to input 16 & 17 of each compartment. The controllers in the successive compartments 14 & 15 detect a drop in vent pressure 6 from the main cooling system 27 and divert the input source from the vent gas 6 to the second line 5, which comes directly from the tanks 4, thus maintaining cooling capability.

Further, an optional feature is the capability of supporting smaller refrigeration units within the TRU 9. Cryogenic ultra low freezers, blast freezers, storage freezers, shipper freezers, storage freezers, chest freezers or storage vats may be loaded onto the TRU 9 and connected to the cryogenic supply line 42 and vent line 43. Quick disconnects at the ends of the lines provide fast and simple means for installing and removing such products. A multiplicity of said supply lines 42 & 44 and vent lines 43 & 45 may be installed in the TRU 9 to accommodate several freezers.

The insulated partitions 21 & 22 between the compartments 13, 14, & 15 must be quickly and easily removed for access to the customer's products. Current art typically uses insulated panels that resemble double doors. Opening the doors often requires moving product out of the way of the swinging doors. Current art single doors often have metal expansion bars that keep the door in place, and the expansion bars must be removed for access. Additionally, the door must also be moved out of the way. Often times, a forklift moves product. All parts of the partition must be moved to accommodate the forklift. The present system has insulated partitions 21 & 22 that retract up to the ceiling and are opened like a garage door with spring assist. Thus, the partitions 21 & 22 are easily opened and thus remotely located for easy product accessibility.

Current TRU's are insulated with injected foam. The main drawbacks are inadequate insulation R factor and degradation over time. Due to limited space, the insulation is typically about 3 inches thick, with a typical R-factor of 6 hr·ft$^{2.°}$ F./BTU per inch or a total of R 18 hr·ft$^{2.°}$ F./BTU for the 3 inch thickness. Over time, the insulation breaks down through vibration and water absorption. Degradation is normally between 3% and 5% per year and has a lifespan of only 7 years. For the first 3 years, the TRU can accommodate frozen goods at −20 deg C., and for the remaining 4 years the TRU is limited to produce that typically operates at 3 deg C.

The present system uses vacuum insulated panels or VIPs 28 to overcome these shortcomings. The VIPs 28 are commercially available. They have a mechanically rigid core and a non-permeable covering. The air is evacuated from the VIP at the factory, reducing the thermal conductivity. The R factor is typically 5 times better than state-of-the-art foam insulated TRUs, significantly increasing fuel efficiency of the present system. The present system has VIPs on all 6 surfaces, thus enclosing the entire TRU. To provide structural stability polyurethane foam is injected between the walls and the VIPs 31 & 32. To further reduce heat gain between the VIPs 29 & 30, foam is also injected to fill these voids.

Prior art diesel cooling systems are mounted in the front of the semi-trailer tractor with a total of 8 bolts, ½ inch in diameter. The location of the bolt pattern is well known in the art. Since the bolt pattern is identical and the geometry is compatible, the current system can easily replace the prior art in a used semi-trailer tractor, or can easily be installed in a new semi-trailer tractor.

Thus, while the invention has been disclosed and described with reference with a limited number of embodiments, it will be apparent that variations and modifications may be made thereto without departure from the spirit and scope of the invention and various other modifications may occur to those skilled in the art. Therefore, the following claims are intended to cover modifications, variations, and equivalents thereof.

What is claimed is:

1. A Transport Refrigeration Unit (TRU), comprising:
   one or more evaporators inside the TRU each containing two manifold tubes located at opposite ends of the evaporator and a multiplicity of cooling tubes traversing between the manifold tubes;
   one or more super-insulated vacuum tanks located in front of, beneath or inside the TRU, filled with liquid nitrogen, carbon dioxide or a cryogenic coolant connected to the one or more evaporators using vacuum-insulated pipes;
   a solenoid or pneumatic valve located upstream or downstream of the evaporator to meter a flow of nitrogen through the evaporator;

a temperature controlling circuit that operates the solenoid or pneumatic valve;

a flow restricting device that limits the flow of the cryogenic coolant through the evaporator;

a vent pipe to vent the spent coolant outside the TRU; and a multiplicity of fans, wherein at least one fan is located adjacent to and above at least one of the evaporators that distribute the cooled air uniformly throughout the TRU;

a vent coolant from the first compartment is supplied to a mechanism that generates and supplies energy to a multiplicity of compartments, wherein a multiplicity of insulated dividers separate the TRU into multiple compartments, each maintained at a different temperature.

2. The device of claim 1, comprising a heater located in an air flow pathto raise the TRU temperature above the ambient temperature.

3. The device of claim 2, wherein the heater is powered by electricity, propane, liquefied natural gas (LNG), compressed natural gas (CNG), liquefied petroleum gas (LPG), or hydrogen.

4. The device of claim 1, comprising a valve to divert a portion of the nitrogen from the vent pipe to injectors inside the TRU.

5. The device of claim 1, wherein the temperature of each of the multiple compartments is cooled by a separate evaporator and fan system and controlled by one or more sensors and solenoid valves within each compartment.

6. The device of claim 1, wherein two separate valves in each compartment change the source from a main compartment vent to a tank source.

7. The device of claim 1, wherein the insulated dividers retract to a ceiling of the TRU.

8. The device of claim 1, wherein the TRU is insulated with Vacuum Insulated Panels on a plurality of sides.

9. The device of claim 1, comprising a bolt mounting frame coupled to the TRU with a matching bolt layout as a bolt layout for standard semi-trailer tractor TRUs.

10. The device of claim 1 wherein the fan and control system arE powered by one or more of the following:
 a. Solar panels attached to the outside top of the TRU,
 b. Nitrogen vent gas turbine generator,
 c. Stirling engine,
 d. Fuel cell,
 e. Deep charge batteries.

11. The device of claim 1 comprising a multiplicity of cryogenic supply and vent lines with quick disconnect fittings.

12. The device of claim 1 comprising a multiplicity of cryogenic supply and vent lines that support sub-cryogenic freezing units within the TRU.

13. A method for transporting an object with a Transport Refrigeration Unit (TRU), comprising:

providing one or more evaporators inside the TRU each containing two manifold tubes located at opposite ends of the evaporator and a multiplicity of cooling tubes traversing between the manifold tubes;

providing one or more super-insulated vacuum tanks located in front of, beneath or inside the TRU, filled with liquid nitrogen, carbon dioxide or a cryogenic coolant connected to the one or more evaporators using vacuum-insulated pipes;

metering a flow of nitrogen through the evaporator with a solenoid or pneumatic valve located upstream or downstream of the evaporator;

controlling the temperature with a circuit that operates the solenoid or pneumatic valve;

flow restricting a flow of the cryogenic coolant through the evaporator;

venting the spent coolant outside the TRU; and distributing cooled air uniformly throughout the TRU with a multiplicity of fans, wherein at least one fan is located adjacent to and above at least one of the evaporators;

supplying the spent coolant vented from a first compartment to a mechanism that generates and supplies energy to a multiplicity of compartments and wherein a multiplicity of insulated dividers separate the TRU into multiple compartments, each maintained at a different temperature.

14. The method of claim 13, comprising a heater located in an air flow path to raise the TRU temperature above the ambient temperature.

15. The method of claim 14, comprising powering the heater by electricity, propane, liquefied natural gas (LNG), compressed natural gas (CNG), liquefied petroleum gas (LPG), or hydrogen.

16. The method of claim 13, comprising diverting a portion of the nitrogen from the vent pipe to injectors inside the TRU.

17. The method of claim 13, comprising separating the TRU with a multiplicity of insulated dividers into multiple compartments, each maintained at a different temperature.

18. The method of claim 13, comprising matching bolt layout frame to a bolt layout frame for standard semi-trailer tractor TRUs.

* * * * *